Feb. 13, 1968     J. SANDERS     3,368,325
APPARATUS AND METHOD FOR RECOVERING SOLVENT
USED IN INDUSTRIAL PROCESSES
Filed March 3, 1967
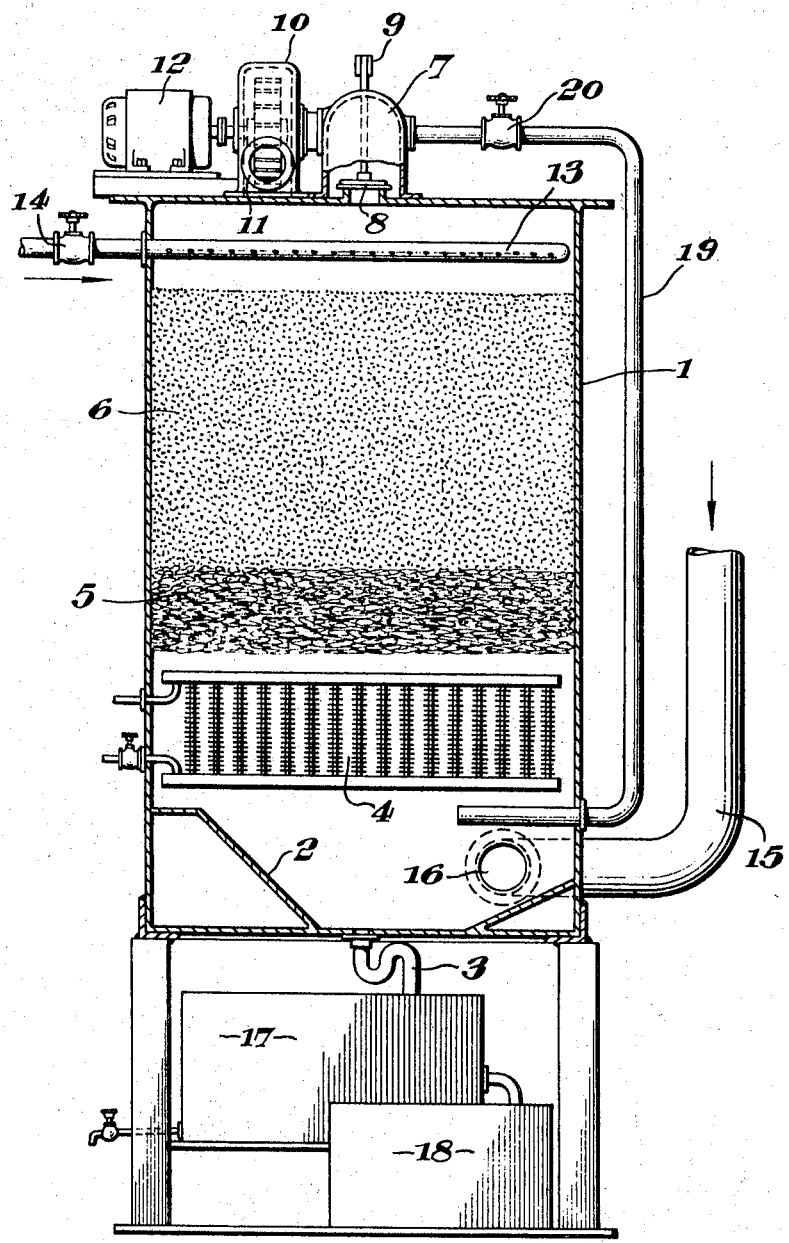
INVENTOR
JAMES SANDERS
By: McGlew and Toren
ATTORNEYS United States Patent Office 3,368,325
Patented Feb. 13, 1968

3,368,325
APPARATUS AND METHOD FOR RECOVERING SOLVENT USED IN INDUSTRIAL PROCESSES
James Sanders, 32–34 Bensham, West Croydon, Surrey, England
Continuation-in-part of application Ser. No. 441,531, Mar. 22, 1965. This application Mar. 3, 1967, Ser. No. 634,397
Claims priority, application Great Britain, Apr. 2, 1964, 13,611/64
3 Claims. (Cl. 55—59)

ABSTRACT OF THE DISCLOSURE

A container or vessel having a vertically elongated recovery chamber which includes a diffuser bed including a layer or bed made of a material providing a large number of interstices such as stainless steel wool and an upper bed of a solvent absorbent material such as a granulated carbon material having a large number of interstices for spreading and diffusing the vapor. Below the diffuser bed is arranged a condenser having means for permitting the circulation of cooling condenser water or for discontinuing such flow. The apparatus includes a valve regulated steam admission pipe having a plurality of openings for spraying steam downwardly on top of the carbon bed. A chamber air withdrawal valve is provided in the upper portion of the chamber adjacent the steam admission pipe for withdrawing air from the top of the apparatus. A suitable fan is connected to a housing for the valve for withdrawing the air when the valve is opened. A second air withdrawal valve is provided in a bypass conduit connecting the fan intake with the lower portion of the chamber for withdrawing air from said lower portion.

The present application is a continuation-in-part of application Ser. No. 441,531, filed Mar. 22, 1965, to James Sanders for Solvent Recovery Apparatus, and now abandoned.

Background of the invention

Solvent from an industrial process is drawn through a large conduit for solvent-laden vapor which discharges into the lower end of the device below the condenser. The bottom wall of the apparatus is provided with an opening connected to a drain which empties into a water separator and the water separator, in turn, is connected to a receptacle 18 for collecting the recovered solvent.

A feature of the inventive construction of the device is that air evacuating means including the air fan is connected through the valve housing at the top of the recovery container to a bypass which extends downwardly to the lower end of the container directly beneath the condenser and above the discharge for the solvent-laden material into the bottom of the apparatus. The bypass line provides a means for speeding up the cleaning or stripping of the solid materials which are entrained by the carbon bed by aiding the circulating of steam downwardly through the bed during the cleaning portion of the operating cycle.

A further aspect of the invention is to provide a method for recovering solvents such as white spirit, trichloroethylene and perchloroethylene which comprises delivering the solvent-laden vapor into a recovery appartus for flow upwardly through a diffuser including a carbon bed while an evacuating fan is connected to the apparatus for removing substantially only air from the location above the carbon bed after the solvent has been absorbed by the carbon bed. After the carbon bed becomes saturated with the solid particles of solvent material, the evacuation of air from the upper portion of the chamber is discontinued and the lower portion of the chamber is connected to the evacuation means in order to aid the downward flow of steam from the top of the chamber downwardly through the carbon bed. During the initial stage of steam admission cold water is circulated through the condenser at the lower portion of the chamber in order to maintain a vacuum below the carbon bed together with the aid of the evacuating means to an amount which will aid in pulling the steam through the diffuser beds. After a few minutes, the evacuation of the lower portion of the apparatus is discontinued to permit collection of the condenser steam and the solvent by draining the lower portion.

Brief summary of the invention

The invention relates, in general, to an apparatus and method for recovering solvent used in industrial processes and, particularly, to a new and useful apparatus and method for recovering solvent from a solvent-laden vapor from an industrial process employing substances such as white spirit, trichloroethylene and perchloroethylene by using a diffuser comprising a material having a large number of interstices and a carbon bed arranged in a vertically elongated apparatus and including a construction for aiding the stripping of the solvent from the diffuser by withdrawing air from below the carbon bed during the initial period of circulation of steam therethrough for removing the solids which have been adsorbed thereby.

The present invention provides an apparatus for recovering solvent-laden vapor which includes a container having a vertically elongated chamber with a diffuser section containing a material such as steel wool and a carbon bed section disposed over the diffuser section. The device includes means for admitting steam adjacent the top of the chamber downwardly or over the carbon bed to strip the solvent from the bed. Means are provided condensing the steam at a location directly below the diffuser bed. The apparatus of the invention provides a simple means for selectively evacuating air directly from the top of the vessel during the time at which solvent-laden vapor is admitted to the bottom of the vessel below the diffuser bed for flow upwardly through the carbon bed. At this time, the air which is removed is substantially clean, the solvent and solid materials having been adsorbed by the diffuser.

A feature of the invention is that the evacuator is connected through a bypass to the lower portion of the recovery chamber immediately below a condenser therein in order to remove air from this location during the operating time at which the steam is initially admitted for flow downwardly through a carbon bed. At this same time, the condenser is operated and the combined action of the condenser with the evacuator causes a rapid flow of the steam through the carbon bed and thus permits a remarkable reduction in the time necessary for stripping the carbon bed of the solid materials.

In accordance with the method of the invention, the apparatus is initially operated to absorb solvent fumes by permitting the fumes to flow upwardly through the diffuser and carbon beds while the top of the vessel containing these beds is continuously evacuated of air. After the bed becomes saturated with solvent and solid materials which are removed from the solvent-laden vapor, a steam spray is directed downwardly over the bed and a condenser is operated below the bed to condense the vapor in the vessel. In addition, in accordance with the invention, the lower portion of the vessel is evacuated by the evacuation fan in order to further reduce the vacuum action and accelerate the movement of the steam downwardly through the bed. The evacuation is carried out for a few minutes up to, for example, around four minutes and then the evacuation is stopped and the condensed steam and solvent are recovered through a drain at the lower portion of the vessel and the water is separated from the solvent which is recovered.

Accordingly, it is an object of the invention to provide an improved solvent recovery apparatus which includes a bypass for evacuating air beneath a carbon bed during the stripping down of the bed with steam.

A further object of the invention is to provide a solvent recovery apparatus in which the stripping cycle of the apparatus in which the carbon bed is stripped of solid materials is substantially reduced.

A further object of the invention is to provide a method of operating a solvent recovering apparatus which includes evacuating the area below a carbon bed in order to accelerate the flow of steam therethrough.

A further object of the invention is to provide a solvent recovery apparatus which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

*Brief description of the drawings*

The only figure in the drawing is a somewhat schematic vertical section through an apparatus for solvent recovery constructed in accordance with the invention.

*Detail description*

Referring to the drawing, in particular, the invention embodied therein comprises a solvent recovery apparatus which includes a casing or housing 1 which defines a vertically elongated recovery chamber which is connected through its bottom to a drain 3 and water separator 17 which, in turn, is connected to a solvent recovery receptacle 18. The solvent recovery chamber is provided with an intermediate area which includes a diffuser including a lower diffuser bed 5 formed with a mass of material such as stainless stell wool and an upper carbon bed 6 above the diffuser bed 5.

In accordance with the invention, an inlet pipe 15 for the solvent-laden vapor coming from an industrial plant operation such as a dry cleaning machine (not shown) is arranged to feed into the lower part of the recovery chamber through an inlet opening 16. The inflow is controlled by a suitable cutoff valve (not shown) which is usually located at the dry cleaning machine or similar apparatus. The solvent vapors are permitted to move upwardly through the diffuser and the carbon bed is assisted in this action by the operation of an air evacuator 10 which is connected to a valve chamber 7 and to the upper portion of the solvent recovery chamber above the carbon bed by the opening of a valve 8 which is indicated as being hand operated by a lever mechanism 9. During this stage of the operation in which the apparatus is absorbing the solvent fumes, the motor 12 is started to drive the evacuator 10 to take suction through the valve chamber 7 from the top of the solvent recovery chamber and to discharge the air which is sucked off from the top of the chamber above the carbon bed after the solvent solid particles ahave been absorbed by the diffuser in the carbon bed. The air which is discharged through the discharge 11 is substantially free from solvent fumes and solid material and may be discharged to atmosphere.

After the carbon bed 6 becomes fully saturated or nearly so with solvent, in accordance with the invention, means are provided for circulating steam downwardly through the carbon bed and the diffuser. For this purpose, the apparatus includes a steam spray pipe 13 which is arranged directly over the carbon bed and connected to a source of steam (not shown) through a control valve 14. A condenser 4 is located directly below the diffuser 5 and it is provided with suitable connections for selectively circulating a cooling fluid such as water to provide for the condensing of the steam which eventually penetrates the carbon bed 6 and the diffuser 5. The bottom of the recovery chamber is provided with inclined walls 2 for the runoff of the condensed steam and solvent materials into the drain 3.

In accordance with a feature of the invention, the carbon bed and diffuser are stripped of solid materials and solvent in a relatively short time by providing a connection from the valve housing 7 through a bypass 19 to the lower portion of the solvent recovery chamber directly beneath the condenser to provide an additional vacuum to aid in the movement of steam downwardly through the diffuser beds during the initial stripping stage. During the initial stages of the circulation of steam through the pipe 13, the valve 20 is opened to connect the bypass to the valve housing and the evacuator 10 the valve 8 being previously closed so that there will be no removal of the steam from the top of the housing. The provision of the bypass 19 accelerates the downward movement of the steam through the bed 6 and the diffuser 5 by initially withdrawing air at a location below the condenser to accelerate the passage of the steam down through the carbon bed which in so doing strips the solvent which has been previously absorbed in the carbon. After this condition has been maintained for four minutes, the fan motor 12 driving the evacuator 10 is switched off and the valve 20 closed so that there will no longer be any suction through the bypass 19. The steam which is admitted through the pipe 13 will then reach the condenser 4 through which cold water is continuously circulated. The steam will condense and the condensed steam and the solvent which has been drawn out of the carbon bed and the diffuser will drop to the bottom of the recovery chamber and through the trap 3 into the separating weir box 17. The condensed steam will then flow separately to the drain and the solvent will be directed into the container 18. This is carried out for a period of approximately eleven minutes so that the total stripping time should take no longer than fifteen minutes after the carbon has been fully or nearly saturated with solvent and the recovery return will be substantial.

Thus, in accordance with the preferred method of the invention, the solvent recovery apparatus is operated by directing the solvent-laden vapor upwardly through a diffuser and carbon bed and withdrawing the air from above the bed which has been removed of the solvent material, thereafter cleaning the carbon bed after it has become saturated with the solvent materials by directing steam downwardly from the top thereof using condenser means below the carbon bed and the diffuser and additional means for initially withdrawing air from below the carbon and diffuser bed for a few minutes until the steam penetrates the beds, thereafter discontinuing the withdrawal of air from below the beds while the steam is permitted to condense, and separating the condensed steam from the solvent.

While a specific embodiment of the invention has been shown and described in detail to illustrate the application of the inventive principles, it will be understood that the invention may be embodied otherwise without departing from such principles.

What is claimed is:

1. Solvent recovery appartaus comprising a casing having a bottom wall and a top wall, a drain-off outlet for recovered solvent in the bottom wall, an inlet for solvent-laden vapor in a side wall near the bottom wall, a first valve-controlled exit through the top wall to a suction device, a vapor diffuser and a bed of carbon above the diffuser in the casing between the inlet and the first valve-controlled exit, a condenser in the casing between the vapor diffuser and the drain-off outlet, a valve-controlled steam supplying device in the casing above the bed of carbon, and, in the side wall below the vapor diffuser, a second valve-controlled exit to the suction device, said apparatus constructed and arranged so that in a first operation stage solvent-laden vapor can be drawn upwards from the inlet and through the vapor diffuser and bed of carbon by suction through the first valve-controlled exit, and in a second operation stage, while the first operation stage is inoperative, steam introduced by the steam supplying device can be drawn downwards through the bed of carbon and the vapor diffuser by suction through the second valve-controlled exit.

2. A solvent recovery apparatus comprising, a housing defining an interior solvent recovery chamber, a diffuser and a carbon bed thereabove arranged intermediate the height of the chamber, a condenser below said diffuser for condensing steam having means for selectively circulating a cooling fluid therethrough, means for directing solvent-laden vapor into said recovery chamber at a location below said condenser and said diffuser for flow upwardly through carbon bed, air evacuating means, means for connecting said air evacuating means to said recovery chamber for withdrawing air from above said carbon bed out of said reaction vessel and discharging it into atmosphere, means for directing steam in a spray downwardly on said carbon bed for cleaning said carbon bed after said carbon bed has become saturated with solvent, a drain below said condenser for collecting the condensed steam with solvent, means for separating the condensed steam from the solvent and for delivering the separate solvent into a separate container, and means for connecting said air evacuating means to said recovery chamber at a location below said condenser for aiding in the initial downward flow of steam through said carbon bed.

3. A method of recovering solvent from an industrial process using a recovery vessel with a diffuser and a carbon bed thereabove and a steam condenser below the carbon bed comprising, directing the solvent upwardly through the carbon bed while removing air from the top of the bed, the solvent being adsorbed in said carbon bed, and continuing until the carbon bed becomes saturated with solvent, thereafter stopping the solvent flow and spraying steam downwardly through the carbon bed while operating the condenser and while withdrawing air from below the carbon bed in order to aid the steam in penetrating the bed for stripping the solids from the bed, discontinuing the withdrawing of air from below the carbon bed when said steam has completely penetrated said carbon bed, condensing the steam which has moved downwardly through the bed collecting the steam with the solvent, and separating the solvent from the steam.

References Cited
UNITED STATES PATENTS

| | | | |
|---|---|---|---|
| 2,777,534 | 1/1957 | McDonald | 55—163 |
| 3,104,936 | 9/1963 | Führing | 8—142 |
| 3,274,755 | 9/1966 | Montagnon et al. | 55—316 X |

REUBEN FRIEDMAN, *Primary Examiner.*

R. W. BURKS, *Assistant Examiner.*